W. T. & J. B. BURTON.
Vehicle-Devices for Checking Horses.
No. 158,359. Patented Jan. 5, 1875.
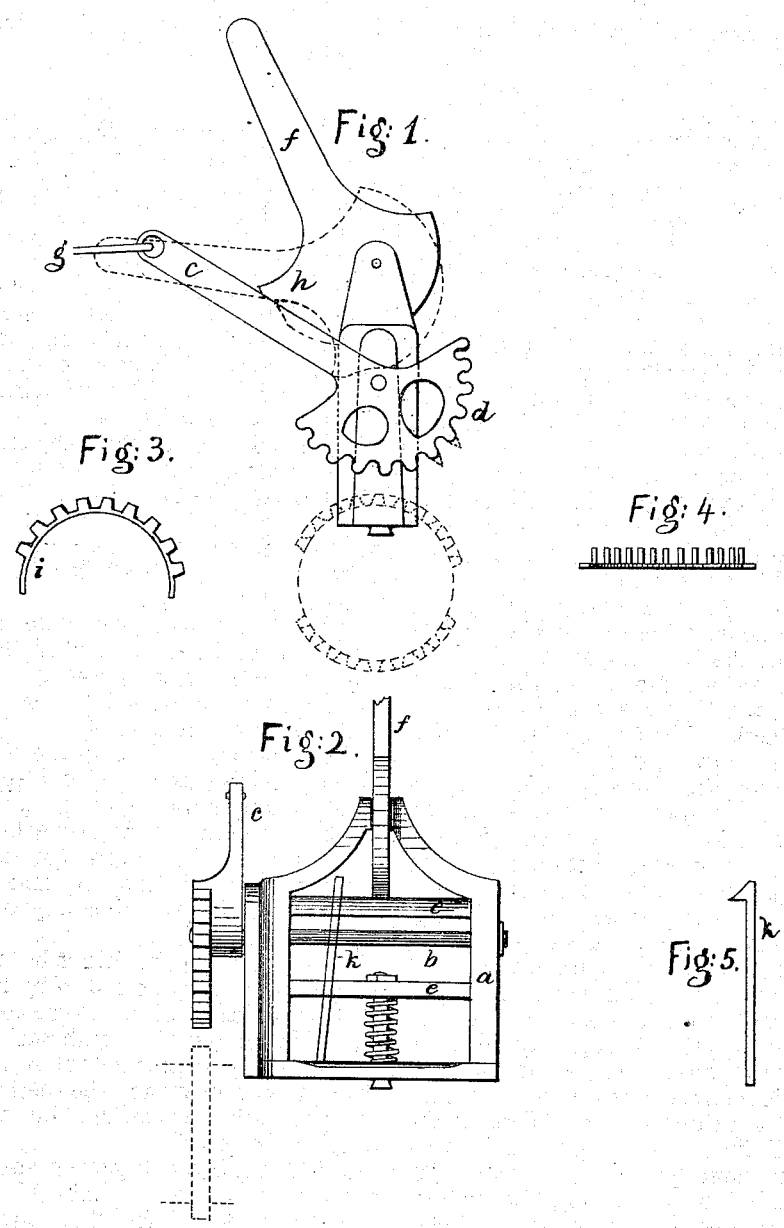

UNITED STATES PATENT OFFICE.

WILLIAM T. BURTON AND JOHN B. BURTON, OF BOSTON, MASSACHUSETTS.

IMPROVEMENT IN VEHICLE DEVICES FOR CHECKING HORSES.

Specification forming part of Letters Patent No. 158,359, dated January 5, 1875; application filed December 2, 1874.

*To all whom it may concern:*

Be it known that we, WILLIAM T. BURTON and JOHN B. BURTON, both of Boston, in the county of Suffolk and State of Massachusetts, have invented Improved Devices for Stopping or Checking Horses, of which the following is a specification:

Our invention relates to devices for stopping or checking horses left standing before carriages, should they start when left alone, and is an improvement on a device described in an application filed by us in the Patent Office October 27, 1874.

In that invention the spring bar or rod carrying the vibrating checking-arm is connected with the step-rod, and is depressed to engage the teeth of this arm with the hub-teeth by weight on the step.

This invention consists in employing a lever or cam to depress the said spring rod or bar that carries the checking-arm.

Figure 1 is an end elevation, Fig. 2 is a side elevation, and Figs. 3 and 4 are modifications, of hub-teeth. Fig. 5 is a catch for holding the teeth in engagement.

In the drawing, the frame $a$, which may be a box, if desired, is attached to the axle by suitable clips. The rod or bar $b$, carrying the checking-arm $c$, is provided with a spring, as shown in said application, to throw it (the checking-arm $c$) in the position shown in Fig. 1; and the teeth $d$ on said arm are depressed, when desired, so as to engage sections of teeth on a band on the hub, such teeth and hub being shown in dotted lines, and they are fully represented in such application. The rod or bar $b$, sustained in the movable frame $e$, in this instance has pivoted above it, one the frame $a$, a cam-lever, $f$. When in the position in full lines it allows the bar $b$ to remain in its elevated position, and the teeth are disengaged; but by turning the cam-lever $f$ to the position shown in dotted lines, Fig. 1, the bar $b$ is depressed, and the teeth $d$ of the arm $c$ engage with the teeth on the hub, so that should the horse start forward the said arm will be drawn quickly and forcibly back, and, acting on a strap, $g$, connecting the end of said arm $c$ with the bridle or bit, will stop or check the horse.

The sections of teeth on the hub—two being commonly used—will give the checking-arm two movements at one rotation of the wheel, the arm flying back to the position shown in Fig. 1, when the sections of teeth on the hub in their rotation pass from the teeth on the arm $c$. This cam has a notch, $h$, or proper holding device, to hold the frame and bar depressed, so as to prevent the cam from slipping, and allowing the bar to rise.

The teeth on the hub, instead of being formed on a band, might be formed on metallic arcs $i$, which may be screwed to the hub, Fig. 3; and, instead of these teeth rising from the hub, they may be made to project, in form of pins, (see Fig. 4,) from the end of the hub band or plate; and with teeth so constructed it will be impossible for the teeth to become clogged with snow, mud, or ice, and the teeth on the sector of the checking-arm might be made sharper, as indicated in dotted lines, Fig. 1.

Instead of this cam-lever we might employ a toggle-lever, one portion of the toggle being connected to the slide, and the other to the frame $a$; or we might use a turn-lever, with a cam at one side.

To positively hold the slide or rod $b$ down, we may employ an additional spring hook or catch, $k$, Fig. 5, arranged to spring over the rod, slide, or carrier of the checking-arm when depressed; and to disengage said checking-arm from the hub-teeth the said catch $k$ must be thrown back, and this may be done in any suitable way.

A depressing lever might be operated by a weight on a step, instead of by hand.

Having described our invention, we claim—

1. The combination, with the checking-arm $c$ and its supporting-rod, of a movable lever to engage or disengage the teeth of the checking-arm with those of the hub, as and for the purpose set forth.

2. The catch $k$ to hold the support $e$ of the rod $b$ in place, and combined therewith to keep the teeth of the checking-arm and the hub in engagement.

In testimony whereof we have signed our names to this specification in the presence of two subscribing witnesses.

WILLIAM T. BURTON.
    JOHN B. BURTON.

Witnesses:
  G. W. GREGORY,
  L. H. LATIMER.